(12) United States Patent
Sugihara

(10) Patent No.: US 11,597,375 B2
(45) Date of Patent: Mar. 7, 2023

(54) VEHICLE CONTROL DEVICE

(71) Applicant: Toyota Jidosha Kabushiki Kaisha, Toyota Aichi-ken (JP)

(72) Inventor: Hiroyuki Sugihara, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 340 days.

(21) Appl. No.: 17/034,155

(22) Filed: Sep. 28, 2020

(65) Prior Publication Data

US 2021/0094530 A1 Apr. 1, 2021

(30) Foreign Application Priority Data

Sep. 30, 2019 (JP) .............................. JP2019-180562

(51) Int. Cl.
*B60W 20/15* (2016.01)
*B60W 10/08* (2006.01)
(Continued)

(52) U.S. Cl.
CPC ............. *B60W 20/15* (2016.01); *B60H 1/004* (2013.01); *B60H 1/00271* (2013.01); *B60H 1/00885* (2013.01); *B60H 1/143* (2013.01); *B60W 10/06* (2013.01); *B60W 10/08* (2013.01); *B60W 10/30* (2013.01); *H02K 7/006* (2013.01);
(Continued)

(58) Field of Classification Search
CPC ...... B60W 20/15; B60W 10/06; B60W 10/08; B60W 10/03; B60W 2510/087; B60W 2555/20; B60W 2710/0677; B60W 2710/086; B60H 1/00271; B60H 1/004; B60H 1/00885; B60H 1/143; B60H 1/32281; B60H 1/3205; B60H 1/3225; B60H 1/3228; B60H 2001/00307; H02K 7/006; H02K 9/19; H02K 11/33;
(Continued)

(56) References Cited

U.S. PATENT DOCUMENTS 4,658,595 A * 4/1987 Shimada ................ B60H 1/323
236/35
2016/0010534 A1 1/2016 Kawakami et al.
(Continued)

FOREIGN PATENT DOCUMENTS

JP 2014-173747 A 9/2014
WO WO-2009056926 A2 * 5/2009 ............. B60K 6/445

*Primary Examiner* — George C Jin
(74) *Attorney, Agent, or Firm* — Dinsmore & Shohl LLP

(57) ABSTRACT

A vehicle control device 40 of a vehicle 200 provided with a cooling circuit 20 using a circulating cooling liquid to cool motors 112, 114 for driving a vehicle or a PCU 118 and a refrigerant circuit 30 discharging heat of the circulating refrigerant for air-conditioning a passenger compartment to the cooling liquid of the cooling circuit 20 and driven by jointly using the outputs of the motors 112, 114 and the output of an engine 12, which control device comprising a cooling mode switching part 42 switching a cooling mode from a normal control mode to a cooling priority control mode cooling the passenger compartment with priority when a predetermined condition stands and a vehicle control part 43 making the outputs of the motors 112, 114 decrease and making the output of the engine 12 increase when the normal control mode is switched to the cooling priority control mode.

9 Claims, 9 Drawing Sheets

(51) Int. Cl.
  *B60W 10/06*   (2006.01)
  *B60W 10/30*   (2006.01)
  *B60H 1/00*    (2006.01)
  *H02K 7/00*    (2006.01)
  *H02K 9/19*    (2006.01)
  *H02K 11/33*   (2016.01)
  *B60H 1/14*    (2006.01)

(52) U.S. Cl.
  CPC ............... *H02K 9/19* (2013.01); *H02K 11/33* (2016.01); *B60H 2001/00307* (2013.01); *F01P 2025/12* (2013.01); *F01P 2025/13* (2013.01)

(58) Field of Classification Search
  CPC ... F01P 2025/12; F01P 2025/13; B60K 11/02; B60K 11/04
  See application file for complete search history.

(56) References Cited

U.S. PATENT DOCUMENTS

| | | | |
|---|---|---|---|
| 2021/0300146 A1* | 9/2021 | Ishizeki | B60H 1/3205 |
| 2021/0309070 A1* | 10/2021 | Ishizeki | B60H 1/32011 |
| 2022/0212517 A1* | 7/2022 | Yu | B60H 1/00392 |

* cited by examiner

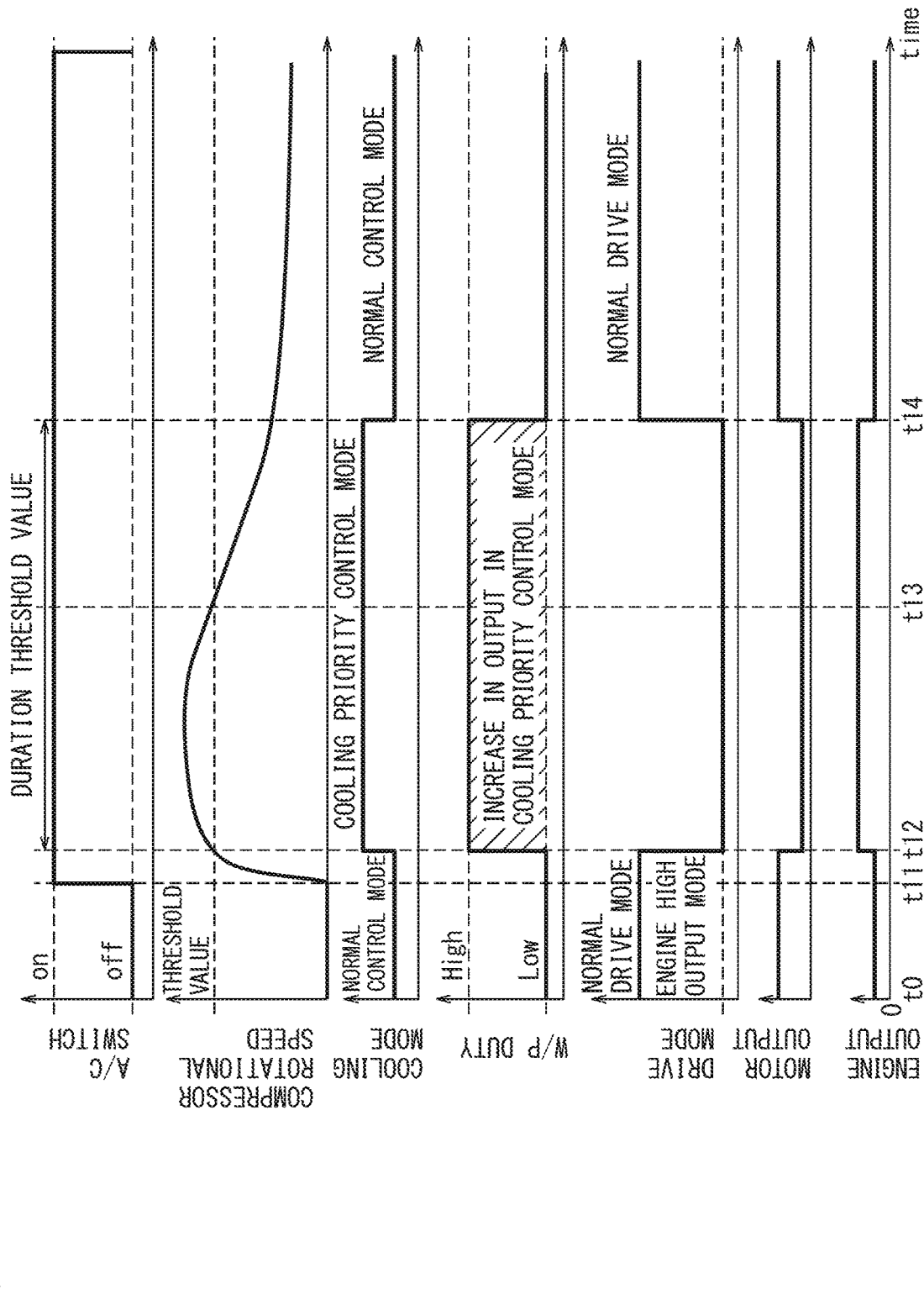

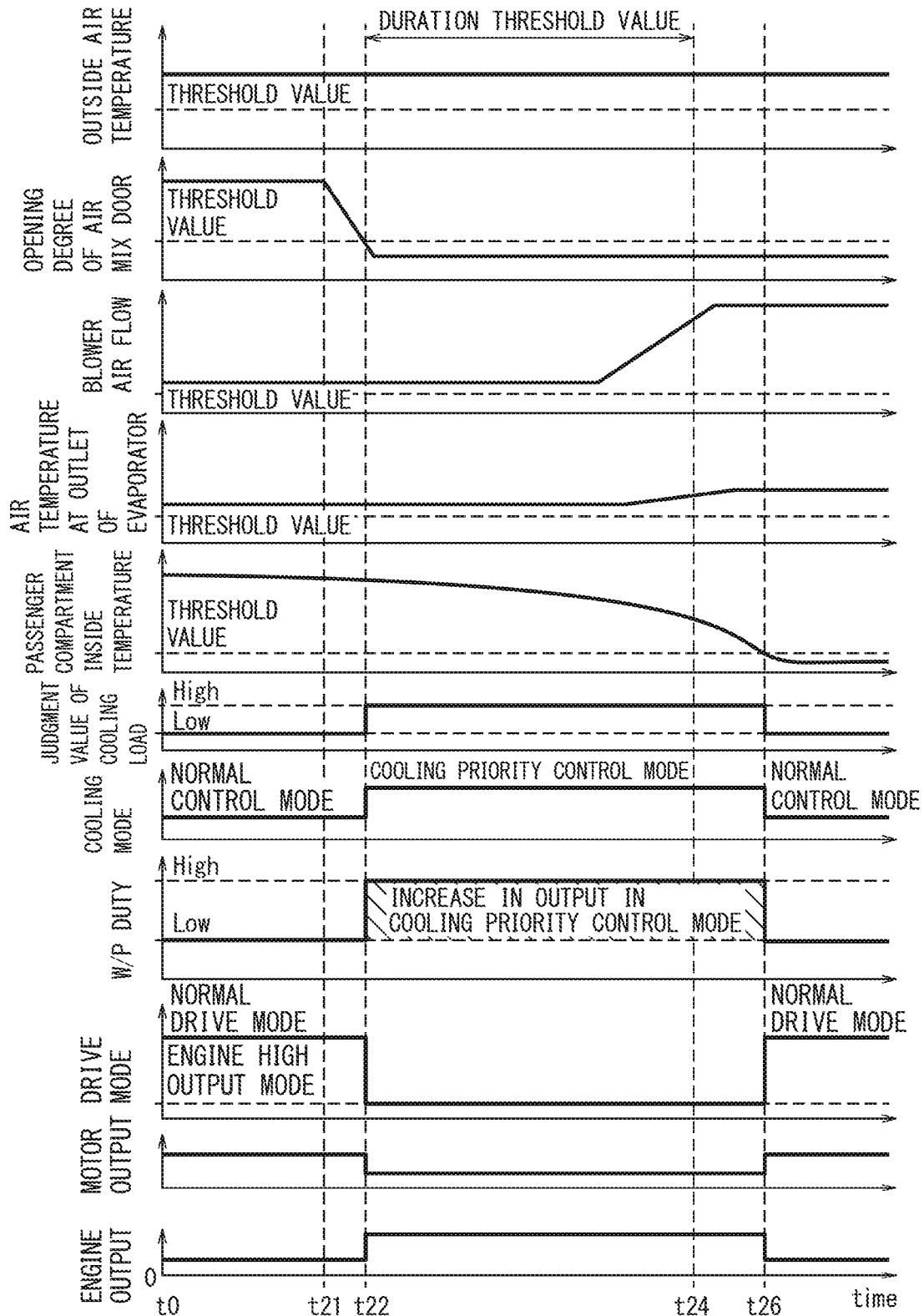

VEHICLE CONTROL DEVICE

CROSS-REFERENCE TO RELATED APPLICATION

This application claims priority to Japanese Patent Application No. 2019-180562 filed on Sep. 30, 2019, which is hereby incorporated by reference including the specification, drawings, and abstract.

FIELD

The present disclosure relates to a vehicle control device.

BACKGROUND

In the past, Japanese Unexamined Patent Publication No. 2014-173747 disclosed a composite type heat exchanger exchanging heat between a refrigerant for air-conditioning use and cooling water for water cooling use cooling strong electrical equipment through a water cooling condenser and discharging exhaust heat at the time of cooling to a low temperature cooling water circuit.

SUMMARY

In the art described in Japanese Unexamined Patent Publication No. 2014-173747, if the temperature of the strong electrical equipment rises and the temperature of the cooling water cooling the strong electrical equipment rises, the discharge of heat from the refrigerant to the cooling water performed through the water cooling condenser becomes insufficient. For this reason, there is the problem that the temperature of the refrigerant cannot be sufficiently lowered and the cooling capacity falls.

In view of the above problem, an object of the present disclosure is to provide a vehicle control device able to keep down a drop in air-conditioning performance in a system discharging heat from a refrigerant for air-conditioning to cooling water of strong electrical equipment.

The present disclosure was made so as to solve the above problem and has as its gist the following.

(1) A control device of a vehicle provided with a cooling circuit using a circulating cooling liquid to cool a motor for driving a vehicle or a power control unit controlling an output of the motor and a refrigerant circuit discharging heat of the circulating refrigerant for air-conditioning a passenger compartment to the cooling liquid of the cooling circuit and driven by jointly using the output of the motor and the output of an engine,
the vehicle control device comprising
a processor configured to:
switch a cooling mode from a normal control mode to a cooling priority control mode cooling the passenger compartment with priority when a predetermined condition stands; and
make the output of the motor decrease and making the output of the engine increase when the normal control mode is switched to the cooling priority control mode.

(2) The vehicle control device according to above (1), wherein the processor is configured to control an output of a water pump making the cooling liquid circulate to the cooling circuit based on a temperature of the cooling liquid in the normal control mode and to control an output of the water pump to a predetermined high value regardless of the temperature of the cooling liquid when switching from the normal control mode to the cooling priority control mode.

(3) The vehicle control device according to above (1), wherein the processor is configured to switch the cooling mode from the normal control mode to the cooling priority control mode when a refrigerant pressure of the refrigerant circuit is a predetermined threshold value or more.

(4) The vehicle control device according to above (1), wherein the processor is configured to switch from the normal control mode to the cooling priority control mode when a rotational speed of a compressor pumping the refrigerant of the refrigerant circuit is a predetermined threshold value or more.

(5) The vehicle control device according to above (1), wherein the processor is configured to judge a cooling load becoming higher the greater an amount of heat to be removed from the inside of the passenger compartment for cooling, and to switch from the normal control mode to the cooling priority control mode when it is judged by the cooling load judgment part that the cooling load is high.

(6) The vehicle control device according to above (5), wherein the processor is configured to judge if the cooling load is high based on an outside air temperature, a passenger compartment inside temperature, an air temperature of an outlet side of an evaporator cooling passing air by the refrigerant, an opening degree of an air mix door adjusting an amount of air supplied from the evaporator to a heater core, or an air flow of a blower supplying air to the evaporator.

(7) The vehicle control device according to above (6), wherein
the air mix door is configured so that the air flow increases the larger the opening degree, and
the processor is configured to judge that the cooling load is high when the outside air temperature is higher than a predetermined threshold value, the temperature of the inside of the passenger compartment is higher than a predetermined threshold value, the air temperature is higher than a predetermined threshold value, the opening degree is smaller than a predetermined threshold value, and the air flow is larger than a predetermined threshold value.

(8) The vehicle control device according to above (1), wherein the processor is configured to switch the normal control mode to the cooling priority control mode, then not to switch from the cooling priority control mode to the normal control mode until a predetermined duration threshold value elapses.

(9) The vehicle control device according to above (1), wherein the processor is configured to make the engine start when the engine stops at the point of time when switching the normal control mode to the cooling priority control mode.

According to the present disclosure, a vehicle control device able to keep down a drop in air-conditioning performance in a system discharging heat from a refrigerant for air-conditioning to cooling water of strong electrical equipment is provided.

BRIEF DESCRIPTION OF DRAWINGS

FIG. 10 is a timing chart showing processing when switching modes by air-conditioning being turned on.

FIG. 11 is a timing chart showing processing when switching modes by judgment of a cooling load.

DESCRIPTION OF EMBODIMENTS

Below, embodiments will be explained in detail with reference to the drawings. Note that, in the following explanation, similar component elements are assigned the same reference notations.

Configuration of Vehicle

Figure 1:
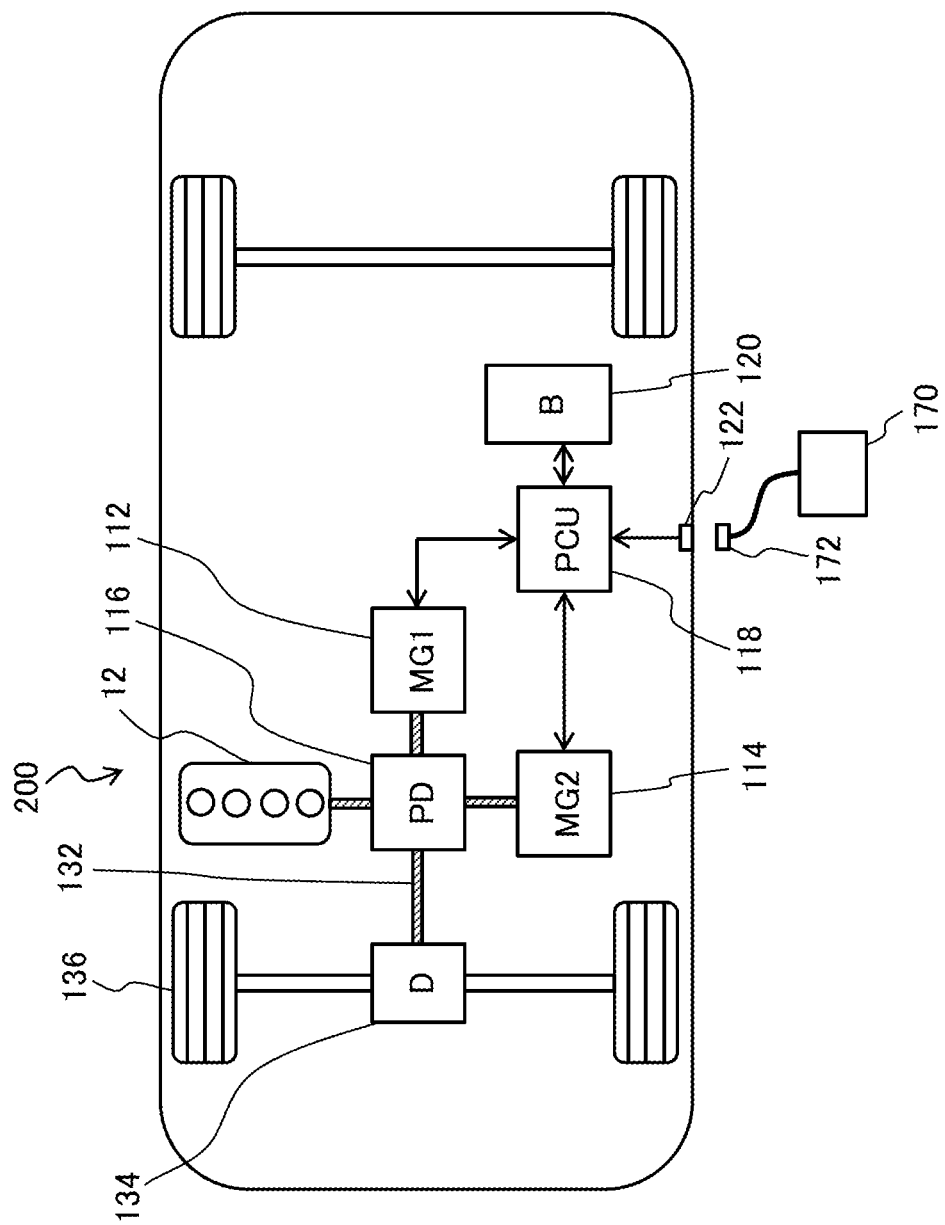
FIG. 1 is a view schematically showing a hybrid vehicle (HV) mounting a control device according to one embodiment.

FIG. 1 is a view schematically showing a hybrid vehicle (HV) 200 mounting a control device according to one embodiment. As shown in FIG. 1, the vehicle 200 is provided with an engine 12, a first motor-generator 112, a second motor-generator 114, and a power distribution module 116. In addition, the vehicle 200 is provided with a power control unit (PCU) 118 electrically connected to the first motor-generator 112 and second motor-generator 114, a battery 120 electrically connected to the PCU 118, and a vehicle side connector 122.

The engine 12 is a prime mover burning fuel such as gasoline or diesel fuel inside of the engine and converting thermal energy of the combustion gas to mechanical energy. The output of the engine 12 is controlled by adjusting the amount of fuel or air supplied to the engine 12. An output shaft of the engine 12 (crankshaft) is mechanically connected to the power distribution module 116. Power generated by the engine 12 is input to the power distribution module 116.

The first motor-generator 112 is mechanically connected at an input/output shaft to the power distribution module 116 and is electrically connected to the PCU 118. If the first motor-generator 112 is supplied with electric power from the PCU 118, it is driven by that electric power and outputs power to the power distribution module 116. Therefore, at this time, the first motor-generator 112 functions as a motor.

On the other hand, if the power from the power distribution module 116 is input to the first motor-generator 112, the first motor-generator 112 is driven by that power and generates electric power. The generated electric power is supplied through the PCU 118 to the battery 120 whereby the battery 120 is charged. Therefore, at this time, the first motor-generator 112 functions as a generator. Note that, the first motor-generator 112 may also be a generator not functioning as a motor.

The second motor-generator 114 is mechanically connected at an input/output shaft to the power distribution module 116 and is electrically connected to the PCU 118. If the second motor-generator 114 is supplied with electric power from the PCU 118, it is driven by that electric power and outputs power to the power distribution module 116. Therefore, at this time, the second motor-generator 114 functions as a motor.

On the other hand, if the power from the power distribution module 116 is input to the second motor-generator 114, the second motor-generator 114 is driven by that power and generates electric power. The generated electric power is supplied through the PCU 118 to the battery 120 whereby the battery 120 is charged. Therefore, at this time, the second motor-generator 114 functions as a generator. Note that, the second motor-generator 114 may also be a motor not functioning as a generator.

The power distribution module 116 is mechanically connected to the engine 12, first motor-generator 112, and second motor-generator 114. In addition, the power distribution module 116 is connected to a drive shaft 132, while the drive shaft 132 is connected through differential gears 134 to the wheels 136. In particular, in the present embodiment, the power distribution module 116 is provided with a planetary gear mechanism. In this planetary gear mechanism, for example, a sun gear is connected to an input/output shaft of the first motor-generator 112, a planetary gear is connected to an output shaft of the engine 12, and a ring gear is connected to an input/output shaft of the second motor-generator 114.

The power distribution module 116 is configured so as to be able to output the power input to the power distribution module 116 from any of the engine 12, first motor-generator 112, second motor-generator 114, and drive shaft 132 connected to the power distribution module 116 to at least one component element among these. Therefore, for example, if power is input from the engine 12 to the power distribution module 116, this power is output to at least one of the first motor-generator 112, second motor-generator 114, and drive shaft 132. Similarly, if power is input from the first motor-generator 112 to the power distribution module 116, this power is output to at least one of the engine 12, second motor-generator 114, and drive shaft 132. In addition, if power is input from the second motor-generator 114 to the power distribution module 116, this power is output to at least one of the engine 12, first motor-generator 112, and drive shaft 132.

The PCU 118 is provided with an inverter, DCDC converter, etc. and is electrically connected to the first motor-generator 112, second motor-generator 114, and battery 120. The PCU 118 controls the first motor-generator 112, second motor-generator 114, and battery 120 and converts the electric power supplied from the battery 120 to these motor-generators 112, 114 and converts the electric power from the motor-generators 112, 114 to the battery 120.

The battery 120 is electrically connected to the PCU 118 and stores power. If the first motor-generator 112 or second motor-generator 114 is driven by the power input from the power distribution module 116, the battery 120 is charged through the PCU 118. On the other hand, when the first motor-generator 112 or second motor-generator 113 outputs power to the power distribution module 116, electric power is supplied from battery 120 through the PCU 118 to the first motor-generator 112 or second motor-generator 113.

The vehicle side connector 122 is a connector for connecting with an external power supply 170. The vehicle side connector 122 is electrically connected to the PCU 118. Further, the vehicle side connector 122 is configured to be able to be connected with an external connector 172 electrically connected to the external power supply 170. If the vehicle side connector 122 is connected to the external connector 172, electric power is supplied from the external power supply 170 to the battery 120 through these vehicle side connector 122 and external connector 172 and the PCU 118. Therefore, the vehicle 200 is configured to be able to charge the battery 120 by the external power supply 170.

In the thus configured vehicle 200, if part or all of the power obtained from the engine 12 is input to the first motor-generator 112 or second motor-generator 114, it is possible to generate electric power by the first motor-generator 112 or second motor-generator 114. The electric power obtained by such generation of electric power is charged to the battery 120 through the PCU 118 or supplied to the motor-generator not generating electric power among the first motor-generator 112 and second motor-generator 114. Therefore, the vehicle 200 is configured to be able to charge the battery 120 with electric power generated by the output of the engine 12. Further, if part or all of the power obtained from the engine 12 is input to the drive shaft 132, it is possible to use this power to make the wheels 136 rotate.

Further, the vehicle 200 is configured to be able to use the electric power supplied from the battery 120 to drive the first motor-generator 112 or second motor-generator 114. The power obtained by driving the first motor-generator 112 or second motor-generator 114 can be input to the engine 12. Therefore, this power can be used to restart the engine 12 when stopped. Further, if inputting the power obtained by driving the first motor-generator 112 or second motor-generator 114 to the drive shaft 132, this power can be used to make the wheels 136 rotate.

Note that, in FIG. 1, the example is shown where two motor-generators 112, 114 are provided at the vehicle 200, but a single motor-generator may also be provided at the vehicle 200.

Drive Operation of Vehicle

Next, the drive operation of the vehicle 200 will be explained. In the drive operation of the vehicle 200, there are, roughly classified, three drive states. The first drive state is the drive state where the engine 12 is stopped and power of one or both of the first motor-generator 112 and second motor-generator 114 is output to the drive shaft 132. Therefore, in this first drive state, the vehicle 200 is driven by only the motor-generators 112, 114. In this first drive state, the battery 120 is not charged and electric power is supplied from the battery 120 to the motor-generators 112, 114.

The second drive state is the drive state where the engine 12 is being operated, part of the power obtained by the engine 12 is output to the drive shaft 132, and the remainder is output to the first motor-generator 112 or second motor-generator 114. In the motor-generators 112, 114 where power from the engine 12 is input, electric power is generated and accordingly the battery 120 is charged. In the second drive state, basically the engine 12 is used to drive the vehicle 200, and the first motor-generator 112 or second motor-generator 114 is used to generate electric power. Note that, in this second drive state, the motor-generator 112 or 114 not generating electric power may output power to the drive shaft 132.

The third drive state is the drive state where the engine 12 is being operated and power obtained by the engine 12 and power obtained by the first motor-generator 112 or second motor-generator 114 is output to the drive shaft 132. Therefore, in the third drive state, the engine 12 and motor-generators 112, 114 are used to drive the vehicle 200. In the third drive state, the battery 120 is not charged and electric power is supplied from the battery 120 to the motor-generators 112, 114.

Further, in the present embodiment, the vehicle 200 is driven by the two drive modes of the normal drive mode and the engine high output mode. In the normal drive mode, the drive state of the vehicle 200 and the outputs of the engine 12 and motor-generators 112, 114 in the drive states are, for example, set based on the drive load on the vehicle 200 (for example, load proportional to the amount of depression of the accelerator pedal) and state of charge (SOC) of the battery 120.

Further, on the other hand, in the engine high output mode, compared with the normal drive mode, the outputs of the first motor-generator 112 and second motor-generator 114 are lowered. The output of the engine 12 is increased by exactly that amount. As a result, if the drive load on the vehicle 200 and the SOC of the battery 120 are the same, the drive power output from the vehicle 200 becomes equal both in the engine high output mode and in the normal drive mode. On the other hand, in the engine high output mode, compared with the normal drive mode, the ratio of the output of the engine 12 in the drive power output from the vehicle becomes larger.

Configuration of Vehicle-Mounted Air-Conditioning System

Next, referring to FIG. 2, the configuration of the vehicle-mounted air-conditioning system 100 according to one embodiment will be explained. The vehicle-mounted air-conditioning system 100 is mounted in the hybrid vehicle 200 shown in FIG. 1. More specifically, the vehicle-mounted air-conditioning system 100 is mounted in a vehicle 200 provided with not only the engine 12, but also the first motor-generator 112, second motor-generator 114, PCU 118, and other strong electrical equipment (high voltage type parts) as vehicle-mounted devices.

Figure 2:
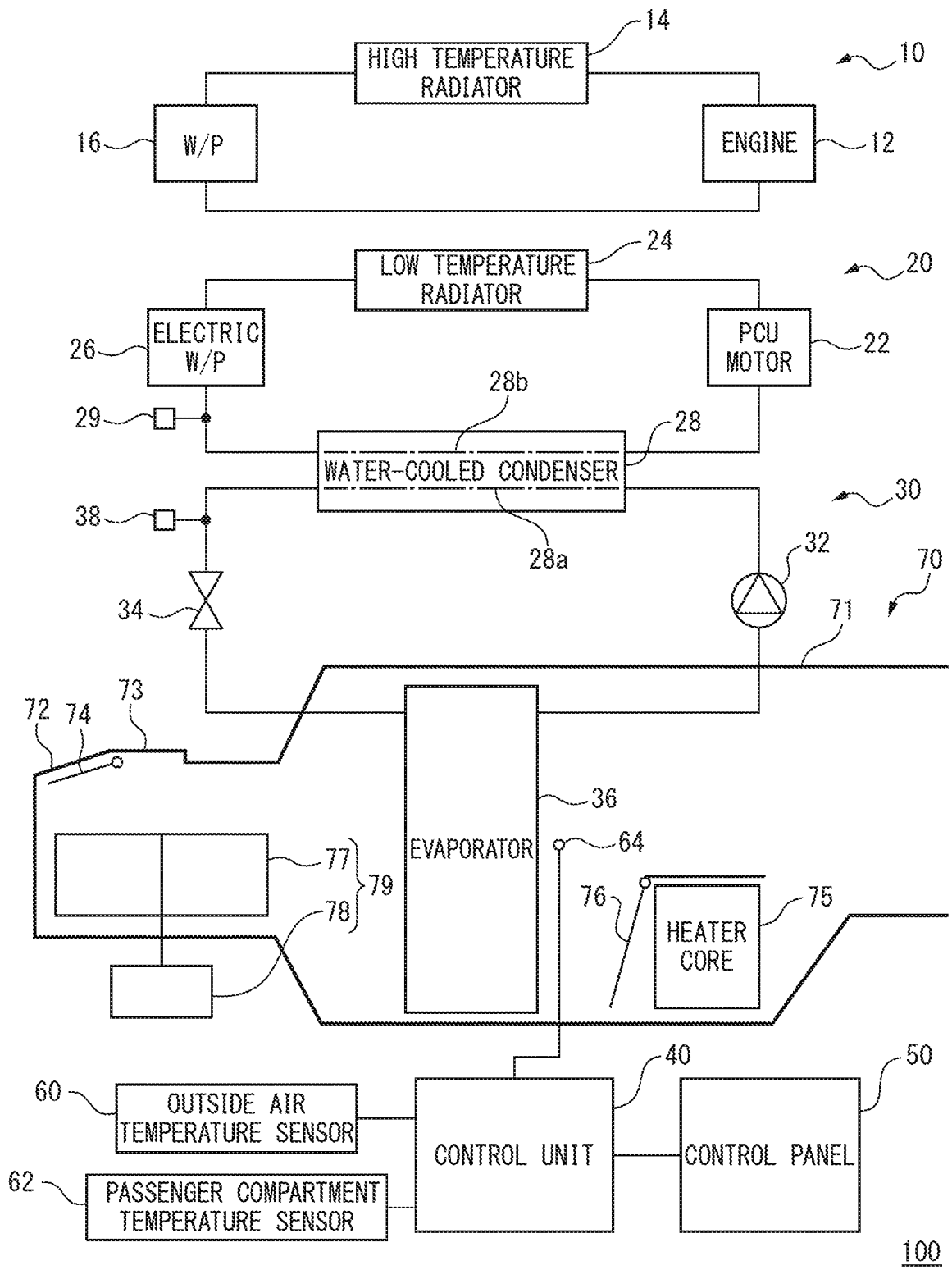
FIG. 2 is a view schematically showing the configuration of a vehicle-mounted air-conditioning system according to one embodiment.

FIG. 2 is a view of the configuration schematically showing the vehicle-mounted air-conditioning system 100. The vehicle-mounted air-conditioning system 100 is configured having a high temperature cooling water circuit 10, low temperature cooling water circuit 20, refrigerant circuit 30, control unit 40, control panel 50, and air-conditioning unit 70.

The high temperature cooling water circuit 10 is a circuit through which cooling water cooling the internal combustion engine system circulates. The high temperature cooling water circuit 10 includes a water cooled engine 12 serving as the drive source of the vehicle, a high temperature radiator 14 for transferring heat of the cooling water cooling the engine 12 to the air at the outside of the vehicle (outside air), and water pump (W/P) 16 for circulating cooling water inside the high temperature cooling water circuit 10. At the high temperature cooling water circuit 10, cooling water circulates through these component parts.

The engine 12 becomes a high temperature along with combustion of fuel. By making cooling water circulate to the high temperature cooling water circuit 10 cooling the engine 12, the engine 12 is kept from excessively rising in temperature.

The high temperature radiator 14 is a heat exchanger exchanging heat between the cooling water circulating through the inside of the high temperature cooling water circuit 10 and the outside air. The water pump 16 is driven by the drive power of the engine 12 and pumps cooling water circulating through the inside of the high temperature cooling water circuit 10. Note that, the water pump 16 may also be an electrically driven pump in the same way as the later explained electric water pump (W/P) 26.

The low temperature cooling water circuit 20 is a circuit through which cooling water cooling the electrical equipment 22 circulates. The electrical equipment 22 includes the above-mentioned first motor-generator 112, second motor-generator 114, and PCU 118. The low temperature cooling water circuit 20 includes these electrical equipment 22, a low temperature radiator 24 for transferring heat of the cooling water to the outside air, an electric water pump (W/P) 26 for circulating the cooling water, a water cooling condenser 28 for transferring heat of the refrigerant of the refrigerant circuit 30 to the cooling water of the low temperature cooling water circuit 20, and a water temperature sensor 29 for monitoring the cooling water temperature of the low temperature cooling water circuit 20. Note that, the low temperature cooling water circuit 20 may also be one cooling at least one of the first motor-generator 112, second motor-generator 114, and PCU 118.

In the low temperature cooling water circuit 20, cooling water circulates through these component parts. Note that, the cooling water is one example of a heat medium circulating through the inside of the low temperature cooling water circuit 20. Any other heat medium may be used instead of cooling water.

The first motor-generator 112 and the second motor-generator 114 included in the electrical equipment 22 are water-cooled types. The heat of the first motor-generator 112 and the second motor-generator 114 are transported to the cooling water of the low temperature cooling water circuit 20. Note that, the first motor-generator 112 and the second motor-generator 114 may also be oil-cooled types. In the case of oil-cooled types, the heat of the first motor-generator 112 and second motor-generator 114 is transferred through a hydraulic circuit to the cooling water of the low temperature cooling water circuit 20.

Further, the PCU 118 included in the electrical equipment 22 is a water-cooled type. The heat of the PCU 118 is transferred to the cooling water of the low temperature cooling water circuit 20. The PCU 118 may also be an oil-cooled type. In this case, the heat of the PCU 118 is transferred to the cooling water of the low temperature cooling water circuit 20 through the hydraulic circuit. Note that, just one of either of the motor-generators and the PCU 118 may also be a water-cooled type.

The electric water pump 26 pumps cooling water circulating through the inside of the low temperature cooling water circuit 20. The electric water pump 26 is an electrically driven type and is configured to be able to be steplessly changed in discharge capacity by adjusting the electric power supplied to the electric water pump 26.

The low temperature radiator 24 is a heat exchanger exchanging heat between the cooling water circulating through the inside of the low temperature cooling water circuit 20 and the outside air. The low temperature radiator 24 is configured to discharge heat to the outside air from the cooling water.

The refrigerant circuit 30 is a circuit through which refrigerant for air-conditioning use circulates. The refrigerant circuit 30 includes a compressor 32 for pressurizing and raising the temperature of the refrigerant for air-conditioning use, water cooling condenser 28 for transferring heat of the refrigerant to the cooling water of the low temperature cooling water circuit 20, expansion valve 34 for reducing the pressure and lowering the temperature of the refrigerant, evaporator 36 for transferring heat from the surroundings to the refrigerant, and refrigerant pressure sensor 38 for detecting the high pressure side refrigerant pressure of the refrigerant circuit 30. In the refrigerant circuit 30, the refrigeration cycle is realized by refrigerant circulating through these component parts. For the refrigerant, for example, a hydro-fluorocarbon (for example, HFC-134a) or any other substance generally used as a refrigerant in a refrigeration cycle may be used.

The compressor 32 functions as a compressor compressing the refrigerant. In the present embodiment, the compressor 32 is an electrically drive type and is configured to be able to be steplessly changed in discharge capacity by adjusting the electric power supplied to the compressor 32. In the compressor 32, the low temperature and low pressure mainly gaseous refrigerant flowing out from the evaporator 36 is made to change to a high temperature and high pressure mainly gaseous refrigerant by adiabatic compression.

The water cooling condenser 28 is provided with refrigerant piping 28a and cooling water piping 28b. The water cooling condenser 28 functions as a heat exchanger making the refrigerant discharge heat to the cooling water of the low temperature cooling water circuit 20 and making the refrigerant condense. In the present embodiment, the water cooling condenser 28 exchanges heat between the refrigerant of the refrigerant circuit 30 flowing through the refrigerant piping 28a and the cooling water of the low temperature cooling water circuit 20 flowing through the cooling water piping 28b and transfers heat from the refrigerant to this cooling water. The refrigerant piping 28a of the water cooling condenser 28 functions as a condenser condensing the refrigerant. Further, in the refrigerant piping 28a of the water cooling condenser 28, the high temperature and high pressure mainly gaseous refrigerant flowing out from the compressor 32 is made to change to a high temperature and high pressure mainly liquid refrigerant by isobaric cooling.

The expansion valve 34 functions as an expander making the refrigerant expand. The expansion valve 34 is provided with a narrow diameter passage. By spraying refrigerant through this narrow diameter passage, it makes the pressure of the refrigerant rapidly fall. The expansion valve 34 sprays liquid refrigerant supplied from the water cooling condenser 28 into the evaporator 36 in an atomized state. In the expansion valve 34, the high temperature and high pressure liquid refrigerant flowing out from the water cooling condenser 28 is reduced in pressure to be partially vaporized, whereby it is made to change to a low temperature and low pressure atomized refrigerant. Note that, the expansion valve may be a mechanical type expansion valve with a fixed superheating degree or may be an electric type expansion valve enabling adjustment of the superheating degree. Further, if able to make the refrigerant expand to reduce it in pressure, as the expander, instead of the expansion valve 34, for example, an ejector or other device may also be used.

The evaporator 36 functions as an evaporator making the refrigerant evaporate. Specifically, the evaporator 36 makes the refrigerant absorb heat from the air around the evaporator 36 to cause the refrigerant to evaporate. Therefore, at the evaporator 36, the low temperature and low pressure atomized refrigerant flowing out from the expansion valve 34 evaporates, whereby it is made to change to a low temperature and low pressure gaseous refrigerant. As a result, the air flowing through the inside of the blower duct 71 around the evaporator 36 of the air-conditioning unit 70 is cooled and the inside of the passenger compartment can be cooled.

The air-conditioning unit 70 includes the evaporator 36 of the refrigerant circuit 30, blower duct 71, centrifugal blower 79 generating a flow of air toward the inside of the passenger compartment inside of this blower duct 71, and heater core 75 heating the air passing through the evaporator 36.

The blower duct 71 is, for example, laid at the front side of the inside of the passenger compartment. At the upstream side of the blower duct 71 in the direction of flow of air, an inside air intake port 72 for taking in air inside of the passenger compartment and an outside air intake port 73 for taking in air outside of the passenger compartment are formed. Further, at the air passage side of the inside air intake port 72 and outside air intake port 73, an inside/outside air switching door 74 is supported to be able to rotate. This inside/outside air switching door 74 is configured to be able to switch the intake port mode to the outside air introduction mode or inside air circulation mode etc. by a driving means (illustration omitted).

The centrifugal blower 79 inside of the blower duct 71 has a centrifugal fan 77 arranged at an upstream side of the blower duct 71 in the direction of flow of air and a blower motor 78 driving rotation of this centrifugal fan 77 etc.

The evaporator 36 is arranged downstream of the centrifugal blower 79 in the direction of flow of air of the blower duct 71, while the heater core 75 is arranged further downstream of the evaporator 36. Near the heater core 75, the air mix door 76 is provided for adjusting the amount of air passing through the heater core 75 and the amount of air bypassing the heater core 75 to adjust the blowing temperature of the air blown to the inside of the passenger compartment. If the opening degree of the air mix door 76 becomes large, the amount of air passing through the heater core 75 increases. To heat the air passing through the evaporator 36, the heater core 75 is for example supplied with cooling water of the high temperature cooling water circuit 10.

Further, at the further downstream side of the blower duct 71 in the direction of flow of air, a not shown plurality of vents (for example, so-called defroster vents, face vents, foot vents, etc.) are formed. Through these vents, the air inside of the blower duct 71 is supplied to the inside of the passenger compartment.

The vehicle-mounted air-conditioning system 100 has, as temperature sensors, in addition to the water temperature sensor 29, an outside air temperature sensor 60 for detecting the outside air temperature, a passenger compartment temperature sensor 62 for detecting the passenger compartment inside temperature, and an outlet temperature sensor 64 for detecting the temperature of the air at the outlet of the evaporator 36.

The control panel 50 is a panel operated by an occupant of the vehicle, that is, the driver etc., and has an air-conditioning (A/C) switch, air flow switch, inside/outside air switch, vent mode switch, etc. The air-conditioning switch is a switch for switching between the on/off states of the air-conditioner. The air flow switch is a switch setting the on/off state of the blower motor 78 and the blower air flow. The inside/outside air switch is a switch for switching between the outside air introduction mode and the inside air circulation mode by driving the inside/outside air switching door 74. The vent mode switch is a switch for switching among the defroster vents, face vents, foot vents, and other vents.

The control unit 40 is a control element controlling the vehicle-mounted air-conditioning system 100 as a whole and is one example of the vehicle control device. The control unit 40 adjusts the outputs of the engine 12 and motor-generators of the electrical equipment 22 based on the rotational speed of the compressor 32, various sensor values, switch signals of the control panel 50, etc. Further, the control unit 40 adjusts the output of the electric water pump 26 of the low temperature cooling water circuit 20 based on the rotational speed of the compressor 32, various sensor values, switch signals of the control panel 50, etc.

The control unit 40 has a processor, memory, and communication interface. The processor has one or more CPUs (central processing units) and their peripheral circuits. The processor may further have a logical processing unit, numerical processing unit, or graphic processing unit or other such other processing circuits. The memory is one example of the storage part and, for example, has a volatile semiconductor memory and nonvolatile semiconductor memory. The communication interface is one example of the communication part and has an interface circuit for connecting the control unit 40 to an internal vehicle network.

Configuration of Vehicle Control Device

Figure 3:
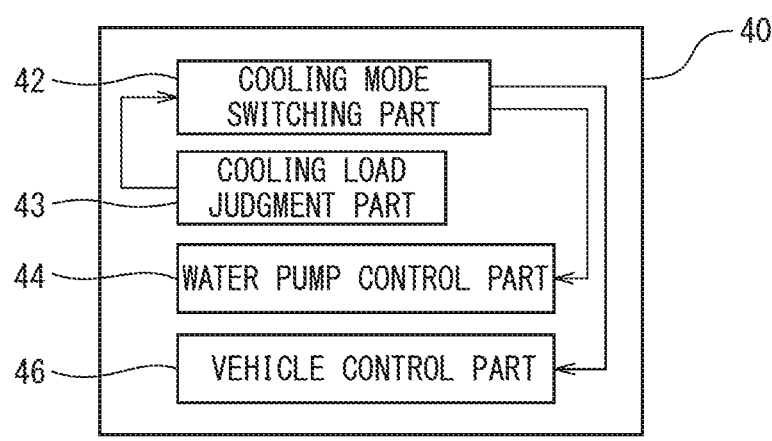
FIG. 3 is a schematic view showing functional blocks of a processor of a control unit.

FIG. 3 is a schematic view showing functional blocks of a processor of the control unit 40. The processor of the control unit 40 has a cooling mode switching part 42, cooling load judgment part 43, water pump (W/P) control part 44, and vehicle control part 46. The parts of the processor, for example, are functional modules realized by a computer program running on the processor. That is, the functional blocks of the processor are comprised of the processor and programs (software) for making function the processor. Further, the program is stored in a memory provided in the control unit 40 or in a storage medium connected from the outside. Alternatively, the parts of the processor may be dedicated processing circuits provided in the processor.

The cooling mode switching part 42 determines the cooling mode based on the processing of the later explained FIG. 4 and sets the cooling mode to either of the normal control mode and the cooling priority control mode. The cooling mode switching part 42 determines the cooling mode and switches to the cooling mode based on the refrigerant pressure of the refrigerant circuit 30, the rotational speed of the compressor 32 of the refrigerant circuit 30, or the cooling load.

The cooling load judgment part 43 judges the cooling load when cooling the inside of the passenger compartment. The cooling load changes in accordance with the amount of heat to be removed from the inside of the passenger compartment for cooling. The larger this amount of heat, the higher the cooling load. The cooling load judgment part 43 judges the cooling load based on the outside air temperature, passenger compartment inside temperature, temperature of the air at the outlet of the evaporator 36, opening degree of the air mix door 76, and air flow of the blower motor 78 based on the processing of FIG. 5 explained later. The water pump control part 44 controls the electric water pump 26 based on the cooling mode. The vehicle control part 46 controls the outputs of the electrical equipment (first motor-generator 112 or second motor-generator 114) and the output of the engine 12 based on the cooling mode.

Control of Vehicle Control Device

In the vehicle-mounted air-conditioning system 100 according to the present embodiment, the high temperature cooling water circuit 10 for cooling the engine 12 and the low temperature cooling water circuit 20 for cooling the electrical equipment 22 are configured by respectively independent water cooling circuits. Further, the low temperature cooling water circuit 20 for cooling the electrical equipment 22 and the refrigerant circuit 30 for air-conditioning the inside of the passenger compartment are made able to exchange heat with each other through the water cooling condenser 28. Common cooling water is circulated to the electrical equipment 22 and the water cooling condenser 28. For this reason, the exhaust heat when cooling the inside of the passenger compartment by the refrigerant of the refrigerant circuit 30 through the water cooling condenser 28 is discharged to the cooling water of the low temperature cooling water circuit 20, so the refrigerant of the refrigerant circuit 30 is cooled.

On the other hand, if the temperature of the cooling water of the low temperature cooling water circuit 20 becomes higher, the discharge of heat from the refrigerant circuit 30 to the low temperature cooling water circuit 20 ends up becoming insufficient and the refrigerant is insufficiently cooled, so the cooling capacity of the inside of the passenger compartment by the evaporator 36 may fall. For this reason, in the present embodiment, if the discharge of heat from the refrigerant circuit 30 to the low temperature cooling water circuit 20 is expected to be insufficient, the outputs of the first motor-generator 112 and the second motor-generator 114 are lowered to reduce the amount of generation of heat by the sources of heat of the low temperature cooling water circuit 20, that is, the electrical equipment 22 such as the strong electrical equipment. On the other hand, the output of the engine 12 is made to increase.

Specifically, the control unit 40 switches the cooling mode from the normal control mode to the cooling priority control mode when the discharge of heat from the refrigerant circuit 30 to the low temperature cooling water circuit 20 is expected to be insufficient. Note that, the case "where the discharge of heat from the refrigerant circuit 30 to the low temperature cooling water circuit 20 is expected to be insufficient" includes both the case where the discharge of heat from the refrigerant circuit 30 to the low temperature cooling water circuit 20 is insufficient and the case where the discharge of heat from the refrigerant circuit 30 to the low temperature cooling water circuit 20 is predicted to be insufficient.

In the normal control mode, the vehicle 200 is driven in the normal drive mode. If the cooling mode is switched from the normal control mode to the cooling priority control mode, the drive mode is switched from the normal drive mode to the engine high output mode. Therefore, when the engine 12 is not operated until then, the engine 12 is started. Further, when the engine 12 was operated, until then, the output of the engine 12 increases. In addition, if the drive mode is switched to the engine high output mode, the outputs of the first motor-generator 112 and the second motor-generator 114 fall.

That is, in the engine high output mode, the outputs of the first motor-generator 112 and the second motor-generator 114 included in the electrical equipment 22 which the low temperature cooling water circuit 20 cools are kept down. Accordingly, the amounts of heat generated by the strong electrical equipment such as the first motor-generator 112, second motor-generator 114, PCU 118 are decreased. On the other hand, the output of the engine 12 is increased and accordingly the drive power of the vehicle 200 is maintained. In the engine high output mode, the drive operation of the vehicle 200 by the first motor-generator 112 and the second motor-generator 114 may be stopped and the vehicle 200 may also be driven by only the output of the engine 12.

By performing such control, the rise in temperature of the cooling water of the low temperature cooling water circuit 20 can be suppressed and an extra margin can be secured for heat discharge from the water cooling condenser 28 to the low temperature cooling water circuit 20, so it becomes possible to reliably lower the refrigerant temperature and the cooling capacity can be kept from ending up falling. Further, the amounts by which the outputs of the first motor-generator 112 and the second motor-generator 114 are suppressed can be compensated for by increasing the output of the engine 12, so the output of the vehicle 200 as a whole can be kept from falling.

Further, the control unit 40 makes the output of the electric water pump 26 increase if the cooling mode is switched from the normal control mode to the cooling priority control mode. Due to this, the flow rate of the cooling water circulating through the low temperature cooling water circuit 20 increases. Inside the low temperature radiator 24, the amount of heat exchanged between the cooling water and the air outside of the vehicle increases, so the cooling water temperature of the low temperature cooling water circuit 20 falls. Therefore, it is possible to secure an extra margin of discharge of heat from the water cooling condenser 28 to the low temperature cooling water circuit 20 and possible to keep the cooling capacity from ending up falling.

Figure 4:
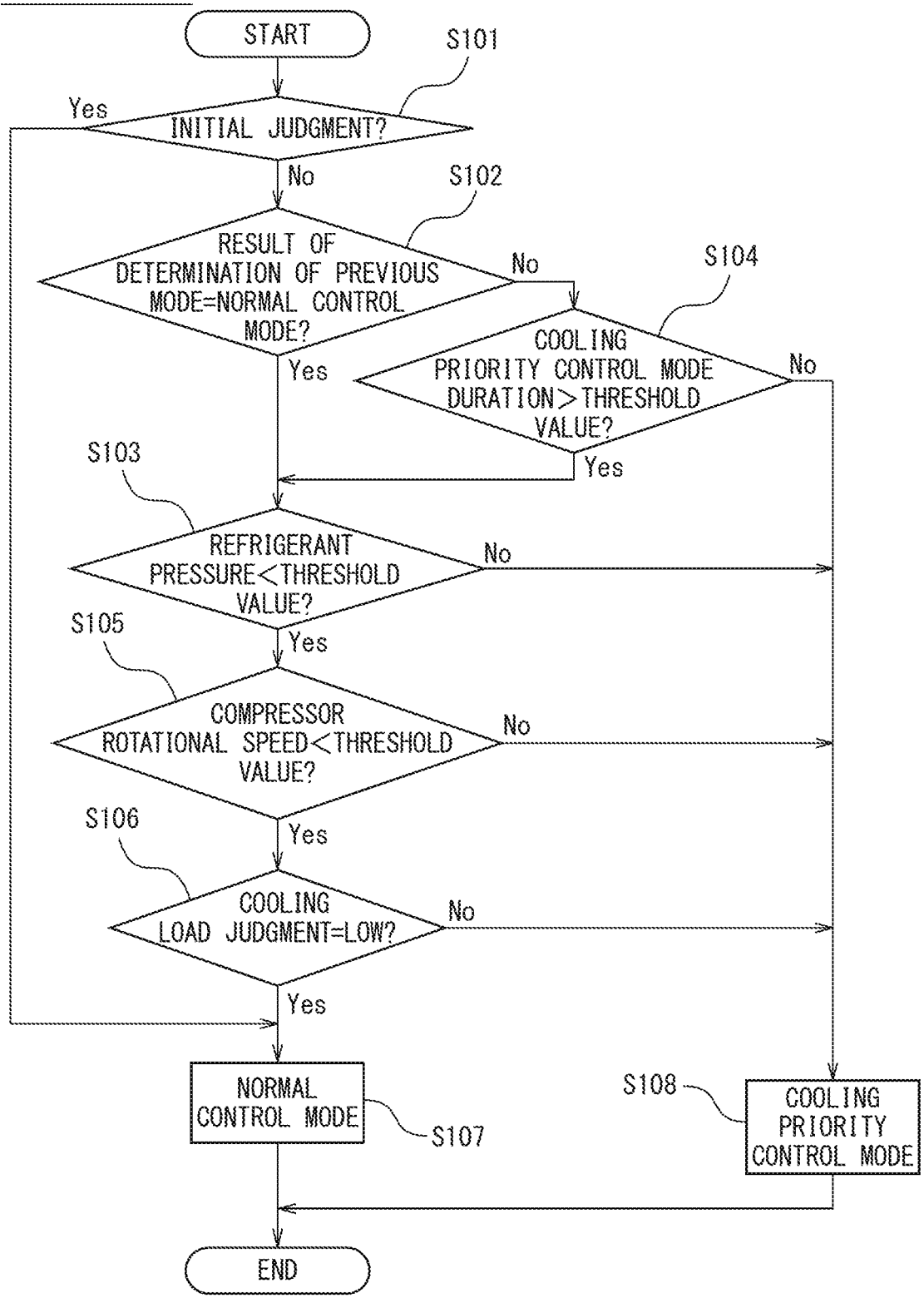
FIG. 4 is a flow chart showing one example of a control routine controlling the vehicle-mounted air-conditioning system of the present embodiment.

FIG. 4 is a flow chart showing one example of a control routine controlling the vehicle-mounted air-conditioning system 100 of the present embodiment. In the main control shown in FIG. 4, when the refrigerant pressure is an upper limit value comprised of a predetermined threshold value or more, when the rotational speed of the compressor 32 is an upper limit value comprised of a predetermined threshold value or more, or when the cooling load is high, the cooling mode switching part 42 of the control unit 40 judges that the discharge of heat from the refrigerant circuit 30 to the low temperature cooling water circuit 20 is expected to be insufficient and switches from the normal control mode to the cooling priority control mode. Note that, at the time of the initial judgment, the mode is made the normal control mode.

The control routine shown in FIG. 4 is performed by the cooling mode switching part 42 every certain time interval. First, it is judged whether the routine is the initial one (step S101). If it is judged that the routine is the initial one, the routine proceeds to step S107 where the cooling mode is set to the normal control mode. Further, if it is not judged that the routine is the initial one, it is judged if the cooling mode determined at the previous routine was the normal control mode (step S102).

If at step S102 it is judged that the cooling mode determined at the previous routine was the normal control mode, it is judged if the refrigerant pressure detected by the refrigerant pressure sensor 38 is less than a predetermined threshold value (step S103). If the refrigerant pressure is less than a predetermined threshold value, it is judged if the rotational speed of the compressor 32 is less than the predetermined threshold value (step S105). Note that, the rotational speed of the compressor 32 is set higher the more strong cooling is required at the inside of the passenger compartment and is set to zero when cooling of the inside of the passenger compartment is unnecessary.

If at step S105 it is judged that the rotational speed of the compressor 32 is less than the predetermined threshold value, it is judged if the cooling load is low (step S106). If it is judged that the cooling load is low, the mode is made the normal control mode (step S107).

Note that, the threshold values used at step S103 and step S105 is a boundary value at which the discharge of heat from the refrigerant circuit 30 to the low temperature cooling water circuit 20 is expected to be insufficient and is found in advance by for example experiments etc. from the relationship of the amount of discharge of heat from the refrigerant circuit 30 to the low temperature cooling water circuit 20 and the refrigerant pressure or compressor speed.

On the other hand, if at step S103 it is judged that the refrigerant pressure is the predetermined threshold value or more, if at step S105 it is judged that the rotational speed of the compressor 32 is the predetermined threshold value or more, or if at step S106 it is judged that the cooling load is high, the cooling mode is set to the cooling priority control mode (step S108). After step S107 and step S108, the processing is ended.

In this regard, if the cooling mode is switched from the normal control mode to the cooling priority control mode, the drive mode of the vehicle 200 is switched from the normal drive mode to the engine high output mode. Therefore, if the engine 12 is stopped before the cooling mode is switched, the engine is started along with switching of the cooling mode. After that, if the cooling mode is returned from the cooling priority control mode to the normal control mode, the engine 12 is stopped. If in such a state the cooling mode is again switched to the cooling priority control mode, the engine 12 is restarted. If such a state is repeated in a short time, sometimes the engine 12 ends up being started up and stopped for short times on a frequent basis. To suppress this, in the processing of FIG. 4, setting the minimum value of duration of the cooling priority control mode and if the duration of the cooling priority control mode is the minimum value of duration or less, the cooling priority control mode is continued. Due to this, the engine 12 can be kept from being started and stopped for short times on a frequent basis.

Specifically, if at step S102 of FIG. 4 it is judged that the cooling mode determined at the previous routine was the cooling priority control mode, it is judged if the duration of the cooling priority control mode has exceeded a predetermined threshold value (duration threshold value) (step S104).

If at step S104 it is judged that the duration of the cooling priority control mode has exceeded a predetermined threshold value, the routine proceeds to the processing of step S103 and on. On the other hand, if at step S104 the duration of the cooling priority control mode is a predetermined threshold value or less, the cooling priority control mode is continued (step S108). Due to this, after the cooling mode is switched to the cooling priority control mode, until the duration of the cooling priority control mode exceeds the predetermined threshold value, the cooling priority mode is continued without switching from the cooling priority control mode to the normal control mode.

In the above way, if the refrigerant pressure is a threshold value or more or the rotational speed of the compressor 32 is a threshold value or more, the discharge of heat from the refrigerant circuit 30 to the low temperature cooling water circuit 20 is expected to become insufficient, so the cooling mode switching part 42 sets the cooling mode at the cooling priority control mode.

If the refrigerant pressure is a threshold value or more or if the rotational speed of the compressor 32 is a threshold value or more, the compressor 32 is operating at a high output, the flow of refrigerant pumped through the refrigerant circuit 30 becomes greater, and the amount of discharge of heat from the refrigerant circuit 30 to the low temperature cooling water circuit 20 becomes greater. Therefore, the cooling water temperature of the low temperature cooling water circuit 20 rises and the discharge of heat from the refrigerant circuit 30 to the low temperature cooling water circuit 20 is expected to become insufficient. Further, even when the amount of heat discharged from the electrical equipment 22 to the low temperature cooling water circuit 20 is great, the discharge of heat from the refrigerant circuit 30 to the low temperature cooling water circuit 20 is expected to be insufficient. For this reason, if the refrigerant pressure is a threshold value or more or if the rotational speed of the compressor 32 is a threshold value or more, the cooling mode switching part 42 judges that the discharge of heat from the refrigerant circuit 30 to the low temperature cooling water circuit 20 is expected to be insufficient and sets the cooling mode to the cooling priority control mode.

On the other hand, even if the refrigerant pressure is less than a threshold value or if the rotational speed of the compressor 32 is less than a threshold value, if the temperature of the inside of the passenger compartment is higher or otherwise if the cooling load is high, the discharge of heat from the refrigerant circuit 30 to the low temperature cooling water circuit 20 is expected to be insufficient.

For this reason, the cooling mode switching part 42 not only renders judgment based on the refrigerant pressure or rotational speed of the compressor 32, but also renders judgment based on the cooling load. If the cooling load is high, it judges that the discharge of heat from the refrigerant circuit 30 to the low temperature cooling water circuit 20 is expected to be insufficient and sets the cooling mode to the cooling priority control mode.

The judgment of whether the cooling load is high is performed by the cooling load judgment part 43. The cooling load judgment part 43 does not directly find the cooling load as the amount of heat to remove from inside of the passenger compartment, but judges the cooling load from the outside air temperature or other environmental conditions or the blower air flow or other operation information of the occupant. More particularly, the cooling load judgment part 43 judges by the processing of the later explained FIG. 5 if the state is one where the cooling load is high and strong cooling is required (cooling load=High) or the state is one where the cooling load is low and cooling is not required that much (cooling load=Low). Based on the result of judgment of the cooling load judgment part 43, if the cooling load is high, the cooling mode switching part 42 predicts that the discharge of heat from the refrigerant circuit 30 to the low temperature cooling water circuit 20 will be insufficient and sets the cooling mode to the cooling priority control mode.

Note that, the processing shown in FIG. 4 is one example. The cooling mode switching part 42 may also use another judgment criteria to determine if the mode is either of the normal control mode and cooling priority control mode. For example, the cooling mode switching part 42 may also judge that the discharge of heat from the refrigerant circuit 30 to the low temperature cooling water circuit 20 is expected to be insufficient and switch from the normal control mode to the cooling priority control mode based on the cooling water temperature in the low temperature cooling water circuit 20, that is, if the cooling water temperature is a predetermined threshold value or more. Further, the cooling mode switching part 42 may also judge that the discharge of heat from the refrigerant circuit 30 to the low temperature cooling water circuit 20 is expected to be insufficient and switch from the normal control mode to the cooling priority control mode based on the electric power consumption of compressor 32, that is, if the electric power consumption is a predetermined threshold value or more.

Figure 5:
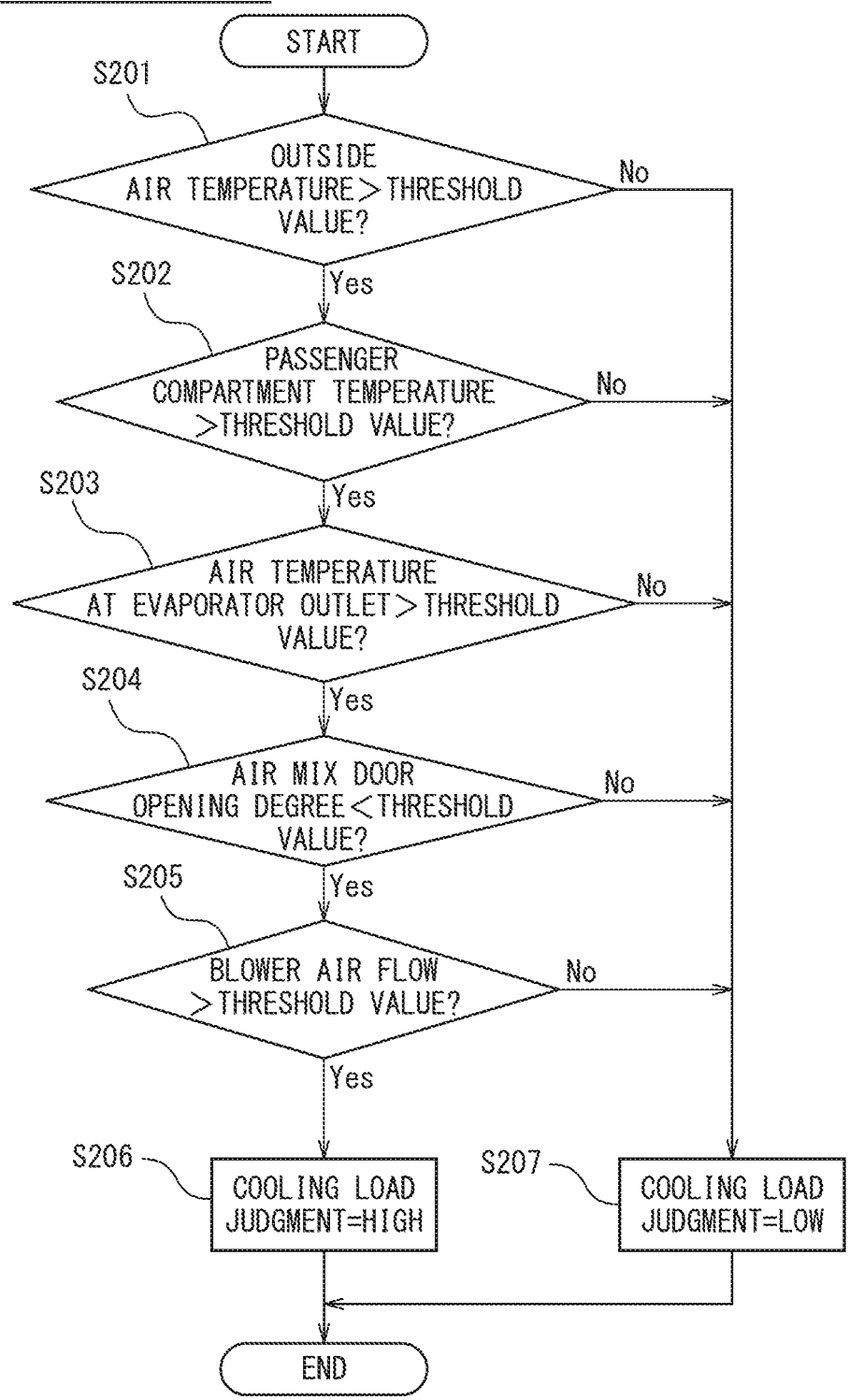
FIG. 5 is a flow chart showing processing judging a cooling load at step S106 of FIG. 4.

FIG. 5 is a flow chart showing processing for judging the cooling load performed at step S106 of FIG. 4. The control routine shown in FIG. 5 is performed by the cooling load judgment part 43 every certain time interval. First, it is judged from the detection value of the outside air sensor 60 if the outside air temperature has exceeded a predetermined threshold value (step S201). Further, if it is judged that the outside air temperature exceeds a predetermined threshold value, it is judged if the passenger compartment inside temperature (inside air temperature) has exceeded a predetermined threshold value from the detection value of the passenger compartment temperature sensor 62 (step S202).

If at step S202 it is judged that the temperature of the inside of the passenger compartment exceeds a predetermined threshold value, it is judged from the detection value of the outlet temperature sensor 64 if the air temperature of the outlet of the evaporator 36 has exceeded a predetermined threshold value (step S203). If it is judged that the outlet temperature of the evaporator 36 has exceeded a predetermined threshold value, it is judged that the opening degree of the air mix door 76 is less than a predetermined threshold value (step S204).

If at step S204 it is judged that the opening degree of the air mix door 76 is less than a predetermined threshold value, it is judged if the air flow due to the blower motor 78 of the centrifugal blower 79 (blower air flow) has exceeded a predetermined threshold value based on the operating state of the air flow switch of the control panel 50 (step S205). If it is judged that the blower air flow has exceeded a predetermined threshold value, it is judged that the cooling load is high (High) (step S206).

On the other hand, if any of the conditions of step S201 to S205 does not stand, it is judged that the cooling load is low (Low) (step S207). After step S206 and step S207, the processing is ended.

Note that, the threshold values used at steps S201 to S205 are found in advance from, for example, experiments etc. from the relationship of the cooling load, the outside air temperature, passenger compartment inside temperature, air temperature of the evaporator outlet, opening degree of the air mix door, or blower air flow.

In the above way, according to the processing of FIG. 5, the cooling load is judged based on the outside air temperature, passenger compartment inside temperature, outlet temperature of the evaporator 36, opening degree of the air mix door 76, and blower air flow by the blower motor 78 of the centrifugal blower 79.

The state where the outside air temperature exceeds a predetermined threshold value, for example, corresponds to the case of driving in the daytime in midsummer or other cases where the outside air temperature is extremely high. Further, the case where the outside air temperature exceeds a predetermined threshold value and the passenger compartment inside temperature exceeds a predetermined threshold value corresponds to the state where the cooling does not sufficiently work. Further, the case where the air temperature of the outlet of the evaporator 36 exceeds a predetermined threshold value is the state where the air flowing through the inside of the blower duct 71 is not sufficiently cooled by the evaporator 36. Therefore, if the outside air temperature exceeds a predetermined threshold value, if the passenger compartment inside temperature exceeds a predetermined threshold value, and if the air temperature of the outlet of the evaporator 36 exceeds a predetermined threshold value, it is estimated that the cooling load will be high.

Further, if the opening degree of the air mix door 76 is smaller than a predetermined threshold value, the amount of the air passing through the heater core 75 is suppressed, most of the air cooled by the evaporator 36 bypasses the heater core 75, and the air cooled by the evaporator 36 is directly introduced into the inside of the passenger compartment. On the other hand, if the opening degree of the air mix door 76 is a predetermined threshold value or more, a greater amount of air passes through the heater core 75 and the air cooled by the evaporator 36 is raised in temperature by the heat of the heater core 75 to adjust the temperature of the inside of the passenger compartment. Therefore, if the opening degree of the air mix door 76 is smaller than a predetermined threshold value, it is estimated that the cooling load is high, while if the opening degree of the air mix door 76 is a predetermined threshold value or more, it is estimated that the cooling load is low. Furthermore, if the blower air flow exceeds a predetermined threshold value, a greater amount of cool air tries to be introduced to the inside of the passenger compartment. Therefore, if the blower air flow exceeds a predetermined threshold value, it is estimated that the cooling load is high.

Therefore, if satisfying all of the conditions of steps S202 to S205 of FIG. 5, it is estimated that the cooling load is high. For this reason, the cooling load judgment part 43 of the control unit 40 performs the processing of FIG. 5 to judge that the cooling load is high if all of the conditions of steps S201 to S205 stand. Further, when the cooling load is high, the cooling mode switching part 42 performs the processing of FIG. 4 to switch the cooling mode from the normal control mode to the cooling priority control mode even if the refrigerant pressure or compressor rotational speed do not satisfy the conditions for switching from the normal control mode to the cooling priority control mode.

Note that, the processing shown in FIG. 5 is one example. The cooling load judgment part 43 may also judge the cooling load is high if one or more conditions of steps S201 to S205 stand. Further, the cooling load judgment part 43 may use other judgment criteria to judge the cooling load. For example, the greater the amount of sunlight outside of the vehicle, the higher the cooling load. The greater the number of occupants inside of the passenger compartment, the higher the cooling load. Therefore, the cooling load judgment part 43 may judge the cooling load based on judgment by these parameters or adding judgment by these parameters to the processing of FIG. 5.

Figure 6:
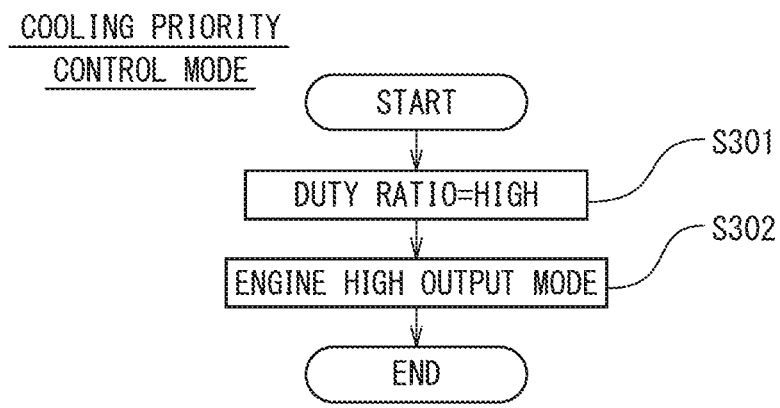
FIG. 6 is a flow chart showing processing when judging a cooling priority control mode at step S108 of FIG. 4.

FIG. 6 is a flow chart showing the processing when it is judged at step S108 of FIG. 4 that the mode is the cooling priority control mode. If it is judged that the mode is the cooling priority control mode, at step S301 of FIG. 6, the water pump control part 44 of the control unit 40 issues an instruction to set the duty ratio of the electric water pump 26 to a high value (High). Next, at step S302, the vehicle control part 46 of the control unit 40 sets the drive mode to the engine high output mode. By raising the duty ratio of the electric water pump 26, the output of the electric water pump 26 increases and the flow rate of the cooling water circulating through the low temperature cooling water circuit 20 increases. Due to this, at the low temperature radiator 24, the amount of heat exchanged between the cooling water and the air at the outside of the vehicle increases, so the cooling water temperature of the low temperature cooling water circuit 20 falls. Further, by the drive mode being set to the engine high output mode, the output of the engine 12 increases and the outputs of the first motor-generator 112 and the second motor-generator 114 decrease. Therefore, the exhaust heat from the first motor-generator 112, second motor-generator 114, PCU 118, and other electrical equipment 220 decreases, so the cooling temperature of the low temperature cooling water circuit 20 falls.

Further, by the cooling water temperature of the low temperature cooling water circuit 20 falling, heat is sufficiently discharged from the refrigerant circuit 30 to the low temperature cooling water circuit 20 through the water cooling condenser 28 and the cooling capacity can be kept from falling.

Figure 7:
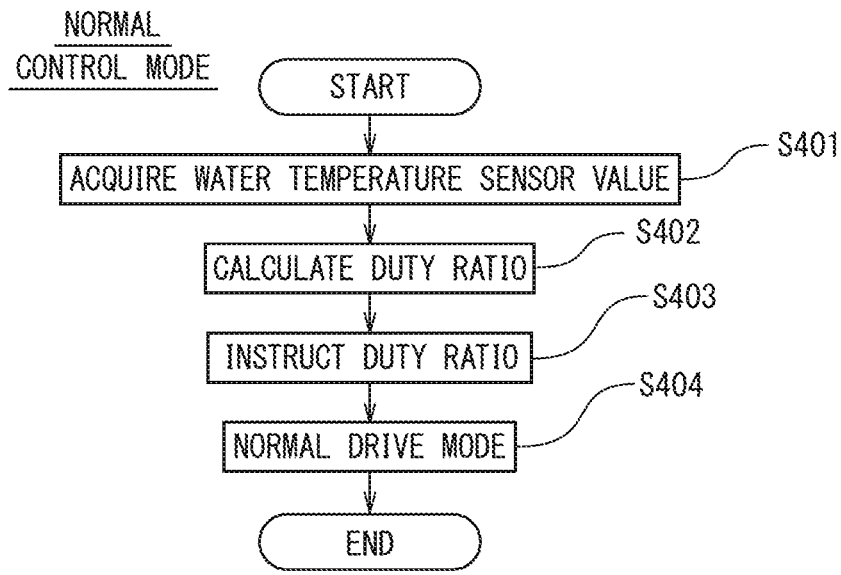
FIG. 7 is a flow chart showing processing when judging a normal control mode at step S107 of FIG. 4.

FIG. 7 is a flow chart showing the processing when it is judged that the mode is the normal control mode at step S107 of FIG. 4. The processing of FIG. 7 is performed by the water pump control part 44 of the control unit 40. If it is judged that the mode is the normal control mode, the water pump control part 44 drives the electric water pump 26 by the minimum necessary extent of output in accordance with the cooling water temperature of the low temperature cooling water circuit 20.

In the normal control mode, first, the cooling water temperature of the low temperature cooling water circuit 20 detected by the water temperature sensor 29 is acquired (step S401). Next, the water pump control part 44 of the control unit 40 calculates the duty ratio of the electric water pump 26 corresponding to the cooling water temperature acquired at step S401 (step S402). Next, the water pump control part 44 instructs the duty ratio to the control system of the electric water pump 26 so as to drive the electric water pump 26 by the duty ratio calculated at step S402 (step S403). Next, the vehicle control part 46 of the control unit 40 sets the drive mode to the normal drive mode at step S404 (step S404).

Figure 8:
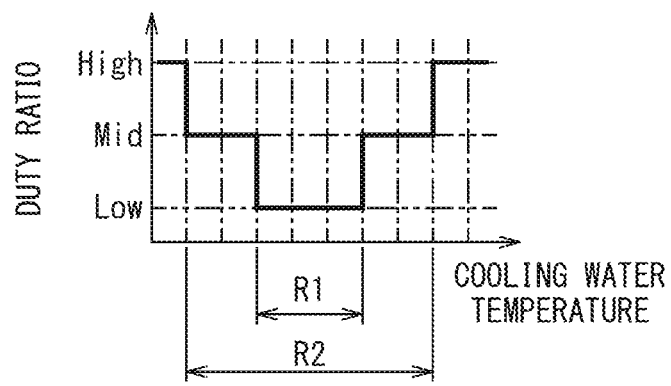
FIG. 8 is a flow chart showing processing performed by a heat pump system of the present embodiment.

FIG. 8 is a schematic view showing an example of a map used when calculating the duty ratio of the electric water pump 26 based on the cooling water temperature at step S402 of FIG. 7. As shown in FIG. 8, if the cooling water temperature detected by the water temperature sensor 29 is within a predetermined range R1, the duty ratio is set to a low value (Low). Further, if the cooling water temperature detected by the water temperature sensor 29 is outside the predetermined range R1 and inside a predetermined range R2, the duty ratio is set to a middle range (Mid). Further, if the cooling water temperature detected by the water temperature sensor 29 is outside the predetermined range R2, the duty ratio is set to a high value (High). Here, if the cooling water temperature is within the predetermined range R1, the cooling water temperature is suitable. The further the cooling water temperature from the predetermined range R1, the less suitable the cooling water temperature.

According to the map shown in FIG. 8, when the cooling water temperature is within the predetermined range R1, the cooling water temperature is suitable, so the duty ratio is set low and the output of the electric water pump 26 is kept to the minimum extent.

On the other hand, when the cooling water temperature is not within the predetermined range R1, the cooling water temperature is not suitable, so the further the cooling water temperature from the predetermined range R1, the higher the duty ratio is set and the more output of the electric water pump 26 is increased. When the cooling water temperature is higher than the predetermined range R1, the flow rate of the cooling water flowing through the low temperature cooling water circuit 20 is increased and the amount of heat exchanged between the cooling water and the air outside of the vehicle at the low temperature radiator 24 increases, so the cooling water temperature of the low temperature cooling water circuit 20 falls. Due to this, the cooling water temperature is controlled to within the suitable predetermined range R1. Further, when the cooling water temperature is lower than the predetermined range R1, the viscosity of the cooling water becomes higher, so to secure the target flow rate of the cooling water, the further the cooling water temperature from the predetermined range R1, the higher the duty ratio is set and the more the output of the electric water pump 26 is increased. In this way, the flow rate of the cooling water is secured even in a low temperature environment since the PCU 118 is weak against rapid temperature changes, so change of the temperature of the PCU 118 is suppressed. Therefore, even when the cooling water temperature is lower than the predetermined range R1, the duty ratio is set higher so as to secure the flow rate of the cooling water.

Therefore, in the normal control mode, by setting the duty ratio of the electric water pump 26 from the cooling water temperature based on the map of FIG. 8, the electric water pump 26 can be driven by the minimum necessary extent of output in accordance with the cooling water temperature. Note that, in the map of FIG. 8, hysteresis may be given so that the timing of change of the duty ratio differs between when the cooling water temperature rises and when the cooling water temperature falls.

In the above way, in the present embodiment, the cooling mode switching part 42 of the control unit 40 judges that the discharge of heat from the refrigerant circuit 30 to the low temperature cooling water circuit 20 is expected to be insufficient and switches the cooling mode from the normal control mode to the cooling priority control mode if the refrigerant pressure is a threshold value or more, if the rotational speed of the compressor 32 is a threshold value or more, or if the refrigerant load is high. Further, in the cooling priority control mode, the vehicle 200 is driven in the engine high output mode, whereby the outputs of the first motor-generator 112 and the second motor-generator 114 are decreased and the rise in temperature of the cooling water of the low temperature cooling water circuit 20 is kept down. Due to this, the discharge of heat from the refrigerant circuit 30 to the low temperature cooling water circuit 20 can be promoted and the drop in cooling performance can be kept down. Further, in the engine high output mode, the output of the engine 12 can be increased to keep down the drop in drive power of the vehicle 200.

Further, when setting the cooling mode to the cooling priority control mode, the duty ratio of the electric water pump 26 is raised, so it is possible to keep down the rise in temperature of the cooling water of the low temperature cooling water circuit 20 in advance and possible to secure the air-conditioning performance. Further, in the normal control mode, the duty ratio of the electric water pump 26 is kept down to a value corresponding to the cooling water temperature, so the electric power consumption can be kept down to the minimum extent without the electric power consumption of the electric water pump 26 being increased more than necessary. Therefore, the amount of electric power consumption of the battery 120 of the vehicle 200 can be suppressed, so the continuous travel distance of the vehicle can be made longer.

Regarding Switching of Cooling Mode

Next, the state of the cooling mode being switched between the normal control mode and the cooling priority control mode will be explained based on the timing chart of FIG. 9 to FIG. 11. As explained by FIG. 4, if the refrigerant pressure is a predetermined threshold value or more, if the compressor rotational speed is a predetermined threshold value or more, or if the cooling load is high, the mode is made the cooling priority control mode. Below, the state of the cooling mode being switched between the normal control mode and the cooling priority control mode will be explained for each of these cases.

Figure 9:
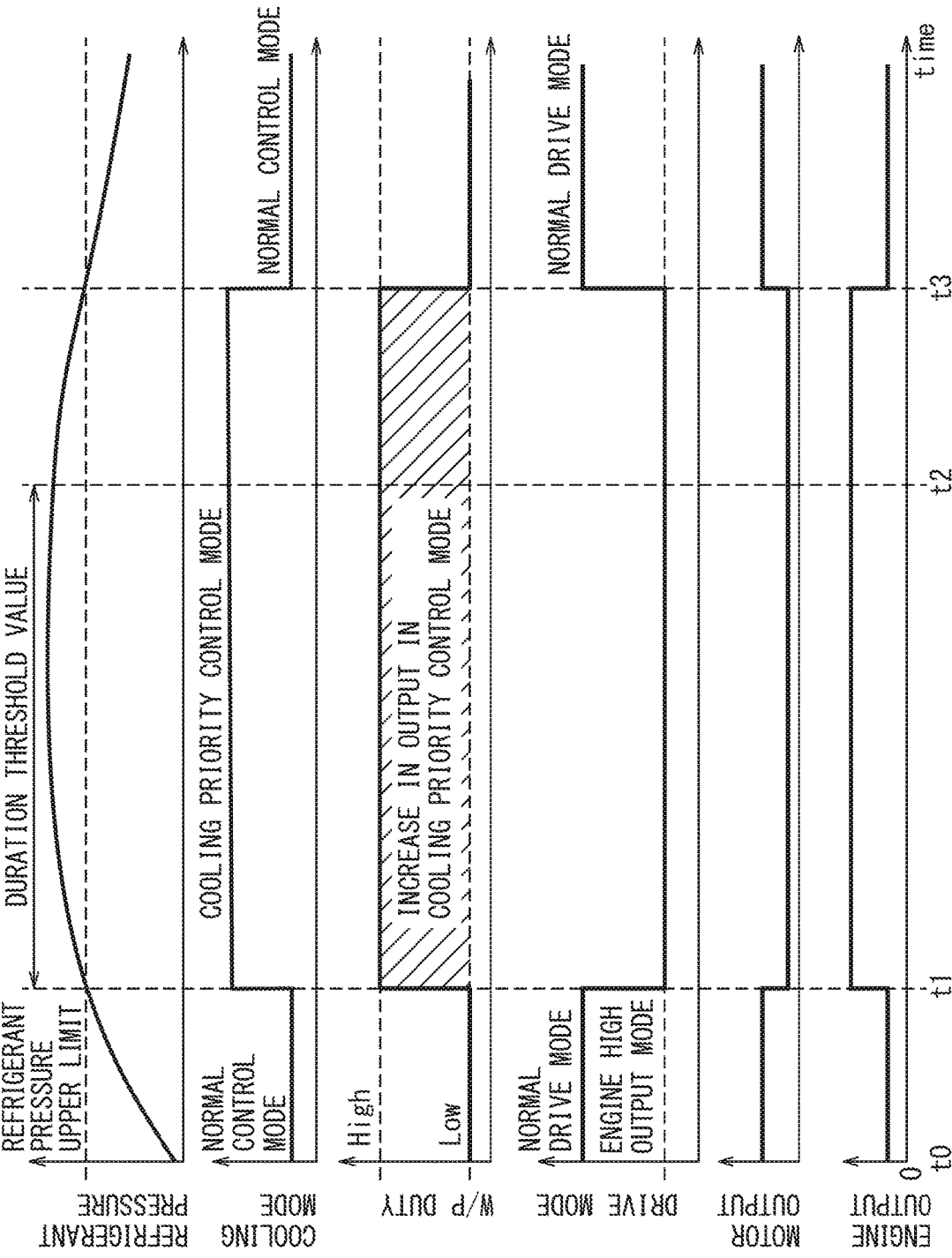
FIG. 9 is a timing chart showing processing when switching modes by a refrigerant pressure being exceeded.

FIG. 9 is a timing chart showing the processing in the case of switching the cooling mode by the refrigerant pressure exceeding a threshold value. More particularly, FIG. 9 shows the processing in the case of switching modes by the conditions of step S105 and step S106 shown in FIG. 4 standing and step S103 not standing. In FIG. 9, in order from the above, the refrigerant pressure, the cooling mode, the duty ratio of the electric water pump 26 (W/P_duty), the drive mode of the vehicle 200, the outputs of the motor-generators 112, 114 (motor outputs), and the output of the engine 12 are respectively shown.

If switching modes by the refrigerant pressure being exceeded, the cooling mode is switched in accordance with the refrigerant pressure. At the time t0, operation by the normal control mode is started, then the refrigerant pressure gradually rises. If at the time t1 the refrigerant pressure reaches a predetermined threshold value, the cooling mode is switched from the normal control mode to the cooling priority control mode and the duty ratio of the electric water pump 26 is set to a high value (High). At the duty ratio of the electric water pump 26 shown in FIG. 9, the hatched region corresponds to the amount of increase of output of the electric water pump 26 in the cooling priority control mode.

After the cooling mode is switched to the cooling priority control mode, the duration threshold value passes at the time t2. At the point of the time t2, the refrigerant pressure still exceeds the threshold value, so even if the duration threshold value passes at the point of the time t2, the cooling priority control mode is maintained. After that, the time t3 and on, if the refrigerant pressure falls from a predetermined threshold value, the cooling mode is switched to the normal control mode and the duty ratio of the electric water pump 26 is decreased. Note that, the following FIG. 9 to FIG. 11 show the case of the normal drive mode where the cooling water temperature is within the predetermined range R1 shown in FIG. 8, that is, the case of the normal drive mode where the duty ratio of the electric water pump 26 is set to low. Therefore, when the cooling water temperature is not within the predetermined range R1 shown in FIG. 8 in the normal drive mode, if the cooling mode is switched to the normal control mode, the duty ratio is lowered to Mid or is maintained as is as High.

Further, regarding the cooling mode of the vehicle 200, at the time t0 and on, until the normal control mode is switched to the cooling priority control mode, the vehicle 200 is driven in the normal drive mode. But if at the time t1 the normal control mode is switched to the cooling priority control mode, the vehicle is switched to the engine high output mode. If at the point of the time t1 the engine 12 is stopped, at the time t1, the engine 12 is started. If after the cooling mode is switched to the cooling priority control mode, at the time t3 the cooling mode is switched to the normal control mode, the drive mode is returned from the engine high output mode to the normal drive mode. As shown in FIG. 9, in the engine high output mode, the outputs of the first motor-generator 112 and the second motor-generator 114 are decreased and the output of the engine 12 is increased from the normal drive mode. Note that, in the engine high output mode, the outputs of the first motor-generator 112 and the second motor-generator 114 may also be made 0. Further, around the time t1 or around t3, the outputs of the first motor-generator 112 and the second motor-generator 114 and the output of the engine 12 may be controlled so that these outputs smoothly change.

In the above way, in the example of FIG. 9, the cooling mode is switched between the normal control mode and the cooling priority control mode in accordance with the refrigerant pressure of the refrigerant circuit 30.

FIG. 10 is a timing chart showing the processing when switching the cooling mode in accordance with the rotational speed of the compressor 32 when an occupant of the vehicle turns the air-conditioning (A/C) switch on. More particularly, FIG. 10 shows the processing when the conditions of step S103 and step S106 shown in FIG. 4 stand and step S105 does not stand and thereby the mode is switched. In FIG. 10, in order from the above, the on/off state of the A/C switch, the rotational speed of the compressor 32, the cooling mode, the duty ratio (W/P_duty) of the electric water pump 26, the drive mode of the vehicle, the outputs of the motor-generators 112 and 114 (motor outputs), and the output of the engine 12 are respectively shown.

If switching the mode by the A/C switch, the cooling mode is switched in accordance with the rotational speed of the compressor 32. After operation by the normal control mode is started at the time t0, if the A/C switch is set to on at the time t11, the rotational speed of the compressor 32 rises. At the time t12, if the rotational speed of the compressor 32 reaches a predetermined threshold value, the cooling mode is switched from the normal control mode to the cooling priority control mode and the duty ratio of the electric water pump 26 is set to a high value (High). After that, the rotational speed of the compressor 32 falls along with the drop of the temperature of the inside of the passenger compartment due to cooling. At the time t13, the rotational speed of the compressor 32 becomes a predetermined threshold value or less, but at this time, the duration threshold value of the cooling priority control mode has not passed, so the cooling priority control mode is continued. After that, if reaching the time t14, the duration threshold value elapses and the rotational speed of the compressor 32 is a predetermined threshold value or less, so the cooling mode is switched to the normal control mode and the duty ratio of the electric water pump 26 falls.

Further, regarding the drive mode of the vehicle, the time t0 and on, until the normal control mode is switched to the cooling priority control mode, the vehicle 200 is driven in the normal drive mode, but if the cooling mode is switched from the normal control mode to the cooling priority control mode at the time t12, the vehicle is driven by the engine high output mode. If at the point of the time t12 the engine 12 is stopped, the engine 12 is started at the time t12. After the cooling mode is switched to the cooling priority control mode, if at the time t14 the mode is switched to the normal control mode, the drive mode is returned from the engine high output mode to the normal drive mode. As shown in FIG. 10, in the engine high output mode, the outputs of the first motor-generator 112 and the second motor-generator 114 are decreased and the output of the engine 12 is increased from the normal drive mode. Note that, in the engine high output mode, the outputs of the first motor-generator 112 and the second motor-generator 114 may also be made 0. Further, around the time t12 or around the time t14, the outputs of the first motor-generator 112 and the second motor-generator 114 and the output of the engine 12 are controlled so that the outputs smoothly change.

In the above way, in the example of FIG. 10, if the cooling mode is switched between the normal control mode and cooling priority control mode in accordance with the rotational speed of the compressor 32, at the point of time when the rotational speed of the compressor 32 falls from the predetermined threshold value, the duration threshold value does not pass, so the passage of the duration threshold value is waited for before the normal control mode is switched to.

FIG. 11 is a timing chart showing the processing when switching the mode by judgment of the cooling load. More specifically, FIG. 11 shows the processing when switching the mode by the conditions of step S103 and step S105 shown in FIG. 4 standing and step S106 not standing. In FIG. 11, in order from the top, the outside air temperature, the opening degree of the air mix door 76, the blower air flow of the blower motor 78 of the centrifugal blower 79, the air temperature of the outlet of the evaporator 36, the passenger compartment inside temperature, the judgment value of the cooling load, the cooling mode, the duty ratio of the electric water pump 26 (W/P_duty), the drive mode of the vehicle, the outputs of the motor-generators 112 and 114 (motor outputs), and the output of the engine 12 are respectively shown.

In the example shown in FIG. 11, the outside air temperature, blower air flow, and air temperature of the outlet of the evaporator 36 are all higher than the threshold values and the conditions of step S201, step S203, and step S205 of FIG. 5 constantly stand. On the other hand, the opening degree of the air mix door 76 and temperature of the inside of the passenger compartment exceed the threshold values along with the elapse of time, so the cooling mode is switched between the normal control mode and the cooling priority control mode in accordance with the opening degree of the air mix door 76 and the passenger compartment inside temperature.

After the start of the operation by the normal control mode at the time t0, at the time t21, the operation for closing the air mix door 76 is started. At the time t22 and on, the opening degree of the air mix door 76 is made smaller than a predetermined threshold value. Further, at the point of the time t22, passenger compartment inside temperature exceeds a predetermined threshold value. Therefore, at the point of time when the time t22 elapses, the conditions of step S202 and step S204 of FIG. 5 stand and the cooling load is judged to be high (High).

If at the point of time when the time t22 elapses, the cooling load is judged to be high (High), the cooling mode is switched from the normal control mode to the cooling priority control mode and the duty ratio of the electric water pump 26 is set to a high value (High).

If after the duration threshold value passes at the time t24, at the time t26, the passenger compartment inside temperature becomes a predetermined threshold value or less, the condition of step S202 of FIG. 5 does not stand and the cooling load is judged to be low (Low). If at the time t26 the cooling load is judged to be low (Low), the cooling mode is switched to the normal control mode and the duty ratio of the electric water pump 26 is decreased.

Further, regarding the drive mode of the vehicle, at the time t0 and on, until the cooling mode is switched from the normal control mode to the cooling priority control mode, the vehicle is driven in the normal drive mode, but if at the time t22, the cooling mode is switched from the normal control mode to the cooling priority control mode, the vehicle is driven by the engine high output mode. If at the point of time of the time t22, the engine 12 is stopped, the engine 12 is started at the time t22. If after the cooling mode is switched to the cooling priority control mode, the mode is switched to the normal control mode at the time t26, the drive mode is returned from the engine high output mode to the normal drive mode. As shown in FIG. 11, in the engine high output mode, the outputs of the first motor-generator 112 and the second motor-generator 114 are decreased and the output of the engine 12 is increased from the normal drive mode. Note that, in the engine high output mode, the outputs of the first motor-generator 112 and the second motor-generator 114 may also be made 0. Further, around the time t22 or around the t26, the outputs of the first motor-generator 112 and the second motor-generator 114 and the output of the engine 12 may be controlled so that the outputs smoothly change.

In the above way, in the example of FIG. 11, in the processing for judgment of the cooling load shown in FIG. 5, the conditions of step S201, step S203, and step S205 stand, so the cooling mode is switched between the normal control mode and the cooling priority control mode in accordance with the relationship among the opening degree of the air mix door 76 and passenger compartment inside temperature and threshold values.

As explained above, according to the present embodiment, if the discharge of heat from the refrigerant circuit 30 to the low temperature cooling water circuit 20 is expected to be insufficient, the drive mode of the vehicle 200 is made the engine high output mode, the outputs of the motor-generators 112 and 114 for driving the vehicle 200 are lowered, and the output of the engine 12 is increased. Due to this, generation of heat by the electrical equipment 22 can be suppressed and the discharge of heat from the refrigerant circuit 30 to the low temperature cooling water circuit 20 can be kept from ending up insufficient, so the cooling capacity can be kept from falling.

Further, if the discharge of heat from the refrigerant circuit 30 to the low temperature cooling water circuit 20 is insufficient, the duty ratio of the electric water pump 26 for circulating the cooling water of the low temperature cooling water circuit 20 is controlled to make the output of the electric water pump 26 increase. Due to this, the cooling water temperature of the low temperature cooling water circuit 20 can be made to fall and the cooling capacity can be kept from falling. Therefore, according to the present disclosure, it becomes possible to realize both driving performance and air-conditioning performance by a simple cooling configuration.

The invention claimed is:

1. A control device of a vehicle provided with a cooling circuit using a circulating cooling liquid to cool a motor for driving the vehicle or a power control unit controlling an output of the motor and a refrigerant circuit discharging heat of a circulating refrigerant for air-conditioning a passenger compartment to the cooling liquid of the cooling circuit and driven by jointly using the output of the motor and the output of an engine, the control device comprising:
a processor configured to:
switch a cooling mode from a normal control mode to a cooling priority control mode cooling the passenger compartment with priority when a predetermined condition stands; and
make the output of the motor decrease and making the output of the engine increase when the normal control mode is switched to the cooling priority control mode.

2. The control device according to claim 1, wherein the processor is configured to control an output of a water pump making the cooling liquid circulate to the cooling circuit based on a temperature of the cooling liquid in the normal control mode and to control an output of the water pump to a predetermined high value regardless of the temperature of the cooling liquid when switching from the normal control mode to the cooling priority control mode.

3. The control device according to claim 1, wherein the processor is configured to switch the cooling mode from the normal control mode to the cooling priority control mode when a refrigerant pressure of the refrigerant circuit is a predetermined threshold value or more.

4. The control device according to claim 1, wherein the processor is configured to switch from the normal control mode to the cooling priority control mode when a rotational speed of a compressor pumping the refrigerant of the refrigerant circuit is a predetermined threshold value or more.

5. The control device according to claim 1, wherein the processor is configured to judge a cooling load becoming higher the greater an amount of heat to be removed from the inside of the passenger compartment for cooling, and to switch from the normal control mode to the cooling priority control mode when it is judged by a cooling load judgment part that the cooling load is high.

6. The control device according to claim 5, wherein the processor is configured to judge if the cooling load is high based on an outside air temperature, a passenger compartment inside temperature, an air temperature of an outlet side of an evaporator cooling passing air by the refrigerant, an opening degree of an air mix door adjusting an amount of air supplied from the evaporator to a heater core, or an air flow of a blower supplying air to the evaporator.

7. The control device according to claim 6, wherein
the air mix door is configured so that the air flow increases the larger the opening degree, and
the processor is configured to judge that the cooling load is high when the outside air temperature is higher than a first predetermined threshold value, the temperature of the inside of the passenger compartment is higher than a second predetermined threshold value, the air temperature is higher than a third predetermined threshold value, the opening degree is smaller than a fourth predetermined threshold value, and the air flow is larger than a fifth predetermined threshold value.

8. The control device according to claim 1, wherein the processor is configured to switch the normal control mode to the cooling priority control mode, then not to switch from the cooling priority control mode to the normal control mode until a predetermined duration threshold value elapses.

9. The control device according to claim 1, wherein the processor is configured to make the engine start when the engine stops at a point of time when switching the normal control mode to the cooling priority control mode.

* * * * *